E. E. GOLD.
THERMOSTATIC ELECTRIC CONTROL FOR HEATING SYSTEMS.
APPLICATION FILED DEC. 15, 1919.

1,424,896.

Patented Aug. 8, 1922.
2 SHEETS—SHEET 1.

INVENTOR
Edward E. Gold
Redding & Greeley
ATTORNEYS

E. E. GOLD.
THERMOSTATIC ELECTRIC CONTROL FOR HEATING SYSTEMS.
APPLICATION FILED DEC. 15, 1919.
1,424,896.
Patented Aug. 8, 1922.
2 SHEETS—SHEET 2.
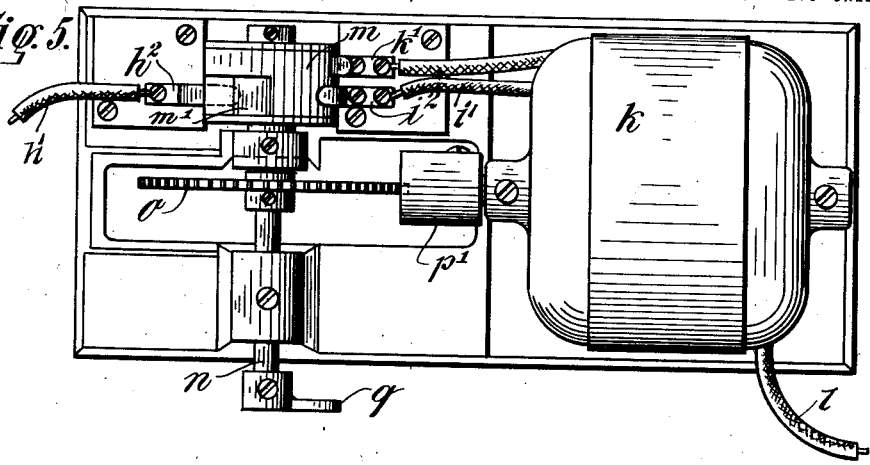
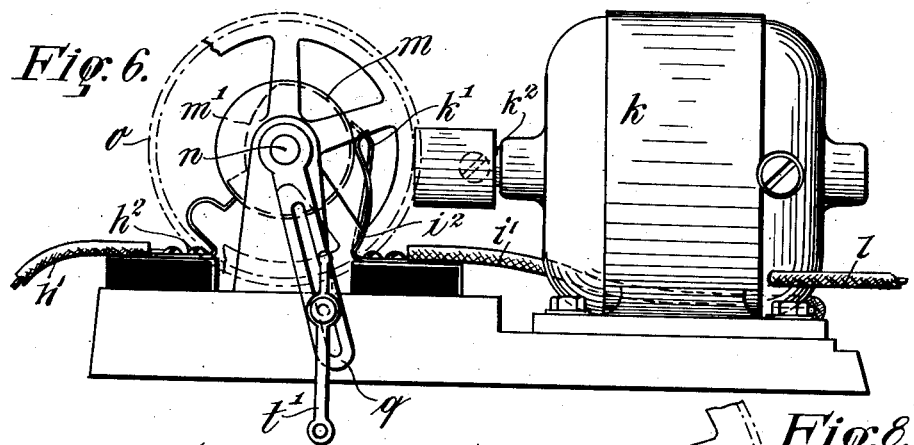
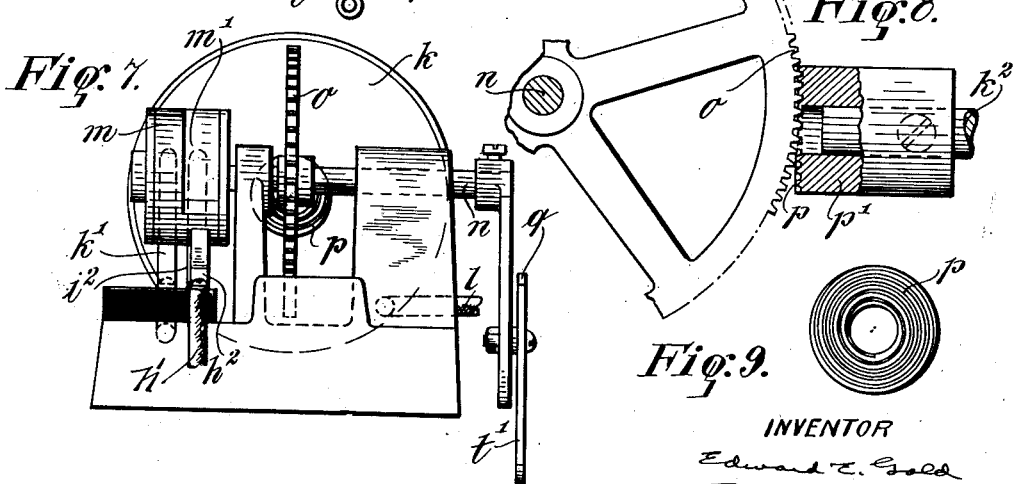
INVENTOR
Edward E. Gold
ATTORNEYS

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

THERMOSTATIC ELECTRIC CONTROL FOR HEATING SYSTEMS.

1,424,896.

Specification of Letters Patent.  Patented Aug. 8, 1922.

Application filed December 15, 1919. Serial No. 344,870.

*To all whom it may concern:*

Be it known that I, EDWARD E. GOLD, a citizen of the United States, residing in the borough of Manhattan, of the city of New York, in the State of New York, have invented certain new and useful Improvements in Thermostatic Electric Controls for Heating Systems, of which the following is a specification, reference being had to the accompanying drawings, forming a part hereof.

In a copending application filed by the present applicant on September 3, 1919, Ser. No. 321,310, now Patent Number 1,373,417, there is shown an improved thermostatic electric control which, in many of its features, is adaptable for use in the improved apparatus although the present invention is not to be limited to the precise character of the thermostat and connections employed. The principal object of the present invention is to provide a complete apparatus under the control of thermostatically operated electric devices for actuating a control element of a heating system. More particularly the invention is concerned with the character of the means by which the connections are completed between the thermostat and the actuating element which, in the improved structure, is an electric motor. A further object of the invention is to associate with the thermostat a manually operable device for causing initiation of the operation of the electric devices by the thermostat at any predetermined temperature. Still another object of the invention is to provide an improved drive between the motor and the controlling element which shall satisfy the peculiar conditions of use in an apparatus of this character.

These and further objects will appear at greater length hereinafter in connection with the detailed description of suitable embodiments of the invention for accomplishing the desired result. Such embodiments are illustrated in the accompanying drawings, by way of example, in which drawing—

Figure 5 is a view in plan of the actuating motor and its electrical and mechanical connections.

Figure 6 is a view in side elevation of the motor and connections shown in Figure 5.

Figure 7 is a view in end elevation of the motor shown in Figure 5.

Figures 8 and 9 are fragmentary detail views, partly in elevation and partly in section, of the gear connection between the motor and the controlling element.

Figure 1:
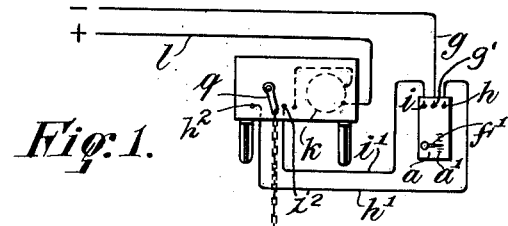
Figure 1 is a view, somewhat schematic indicating the complete apparatus as employed for controlling the damper of a furnace.
Figure 2:
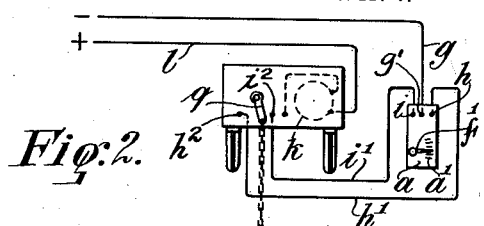
Figure 2 is a view similar generally to Figure 1, but showing the control of a valve in a pipe through which passes the heating medium.
Figure 3:
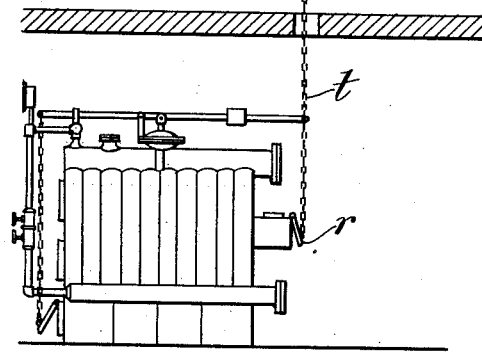
Figure 3 is a view in elevation of a suitable thermostat for initiating operation of the electric controlling devices.
Figure 3:
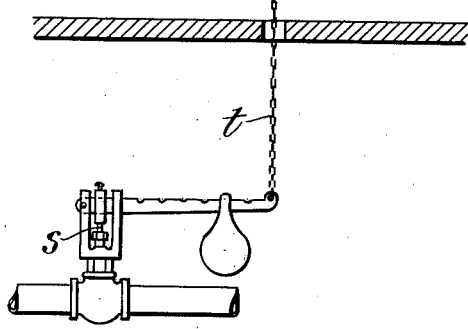
Figure 3:
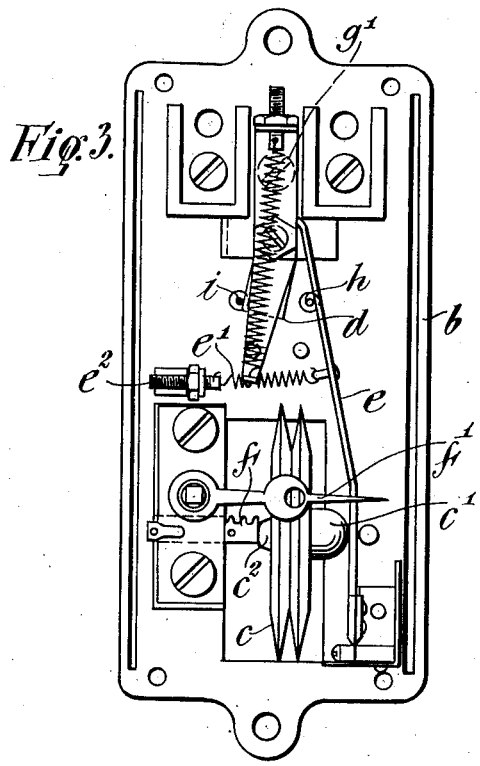
Figure 4:
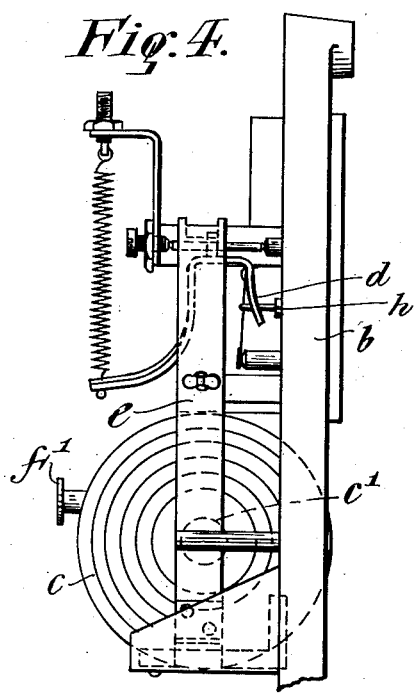
Figure 4 is a view in side elevation of the thermostat and connections shown in Figure 3.

The thermostatic control is shown as mounted in a casing $a$ which is placed within the room or compartment whose temperature is to be controlled. A suitable form of thermostatic electrical control is shown on an enlarged plan in Figures 3 and 4 and this control will be mounted within the casing $a$. The elements are carried on a plate $b$ and include generally an expansible thermostat $c$, a movable switch member $d$ and a swinging arm $e$ operatively connected with the switch member $d$ and movable under the influence of the thermostat $c$ against the action of a spring $e'$, the tension of which is adjustable by means of a screw $e^2$. The thermostat $c$ carries on one wall a boss $c'$ which engages the swinging arm $e$, and on the other wall a seat $c^2$ which rests against the end of a slidable rack $f$, the position of the end of which with respect to the seat $c^2$ may be determined by manual movement of a crank arm $f'$ which is operatively geared with the rack $f$ and is movable over a graduated temperature scale $a'$ provided on the front wall of the casing $a$. By setting the indicator arm $f'$ at the desired temperature indication on the scale $a'$, the rack $f$ will afford a stop for the seat $c^2$ of the thermostat in such relation to the swinging arm $e$ that the expansion of the thermostat $c$ at the predetermined temperature will be such as to cause movement of the swinging arm at such temperature. One wire $g$ of the main line is connected to the switch member $d$ through the terminal post $g'$. The terminals $h, i$ with which the switch member $d$ contacts in one or the other extreme position have been indicated on the casing $a$ in Figures 1 and 2, for convenience. One of these terminals $h$ is connected through a lead wire $h'$ with a contact finger $h^2$ shown in Figures 5—7, while the other terminal $i$ is connected through a lead wire $i'$ with a contact finger $i^2$ illustrated in the same figures.

The actuating means for the controlled element is illustrated herein as an electric motor $k$, the exciting circuit of which is constantly connected with the other of the main lines $l$. The other side of the motor is connected to a contact finger $k'$. The several contact fingers $h^2$, $i^2$, $k'$, co-operate with a commutator $m$ and complete the circuit of the motor from time to time under the control of the thermostat for the purpose of causing actuation of the controlled element in the heating system.

One feature of the invention has to do with the peculiar construction of the commutator $m$ and the relation thereto of the several contact fingers $h^2$, $i^2$ and $k'$ for the purpose of effecting the desired control of the motor $k$. As shown in Figure 5, the fingers $h^2$, $i^2$ are preferably mounted in substantially the same vertical plane and at opposite sides of the commutator $m$, while the finger $k'$ is set off at one side of the fingers $h^2$, $i^2$ so as constantly to engage the commutator $m$ at a different section. The commutator $m$ is formed with an eccentric recess $m'$ in its periphery which recess is adapted to be entered by the fingers $h^2$, $i^2$, depending upon the angular position of the commutator for a purpose which will presently appear.

On the shaft $n$ of the commutator $m$ is secured a gear $o$ the teeth of which mesh with a spiral gear $p$ formed in the end face of a sleeve $p'$ which is secured on the armature $k^2$ of the motor $k$. The gear $o$, together with the shaft $n$, is adapted to be rotated upon rotation of the armature shaft $k^2$. On the shaft $n$ may also be secured an arm $q$ which is operatively connected with the controlled element in the heating system, this element, in Figure 1, being illustrated as a damper $r$, and in Figure 2, as a valve stem $s$, the connection to each of these controlled elements being made in each instance by means of a chain $t$.

In the operation of the device the rack $f$ which constitutes the abutment for the seat $c^2$ of the thermostat $c$ is set in the desired position by moving the indicator hand $f'$ to the desired temperature scale mark on the case $a$, as described hereinbefore. The parts are so related that for such a setting the thermostat $c$ will expand a sufficient extent to move the arm $e$, at the room temperature for which the setting is made. So long as the temperature remains below the predetermined point, the arm $e$ will be held in its position of rest under the influence of the spring $e'$. At this time, the switch member $d$ will engage the terminal $h$. The commutator $m$ will then be in such angular position that the finger $h^2$ will rest within the eccentric recess $m'$ on the commutator and the circuit will be broken at that point. The other finger $i^2$, as well as the finger $k'$, will then be in engagement with the face of the commutator $m$, but since the switch member $d$ is at this time out of engagement with the terminal $i$ the circuit to the motor will be broken at the terminal $i$. When the room temperature reaches the predetermined point, expansion of the thermostat will serve to swing the arm $e$ to the right as viewed in Figure 3, thereby causing movement of the switch member $d$ from the terminal $h$ to the terminal $i$. The motor circuit will then be completed through the conductor $i'$, the finger $i^2$, the commutator $m$ and finger $k'$. The armature shaft $k^2$ of the motor will then rotate and the engagement of the spiral gear $p$ on the shaft with the teeth of the gear $o$ will serve to rotate the shaft $n$ with the commutator $m$ and arm $q$. Movement of the arm $q$ will communicate the desired movement to the controlled element $r$, $s$ or the like for the purpose of reducing the amount of heat supplied to the room. Rotation of the shaft $n$ in the manner described will continue until the contact finger $i^2$ is brought into the recess $m'$ of the commutator $m$ when the motor circuit will be interrupted. Meanwhile the commutator $m$ will have moved into contact with the finger $h^2$.

The parts will all remain in the condition described until the thermostat $c$ contracts and the arm $e$ is moved under the influence of the spring $e'$ to swing the switch member $d$ from the terminal $i$ to the terminal $h$. The motor circuit will then be completed through the conductor $h'$, finger $h^2$, commutator $m$ and finger $k'$, and the armature shaft $k^2$ will be rotated with the spiral gear $p$ until the shaft $n$ has been rotated a sufficient angular distance to bring the finger $h^2$ into the recess $m'$ on the commutator $m$ when the motor circuit will be broken. The described rotation of the shaft $n$ will effect such movement of the controlled element $r$ or $s$ as to cause an increase in the amount of heat supplied to the room. The operation first described herein will then be repeated. The result is a more or less even temperature in the room, the parts coming into action when the temperature varies through a comparatively narrow range. It will be noted that the peculiar character of the gearing between the motor and the driven shaft is such as to hold the parts locked against movement except upon rotation of the armature shaft $k^2$ and that the rotative movement is unidirectional, the crank arm $q$ revolving under successive rotations of the armature shaft. The degree of linear movement of the connecting device $t$ extending to the controlled element $r$ or $s$ may be readily adjusted as indicated in Figure 6 by a slot and stud connection between the arm $q$ and a link $t'$ with which the connecting means $t$ is engaged.

The particular character of the thermostat may be changed and other modifications in the particular electrical and mechanical connections employed may be made without departing from the spirit of the invention, provided the complete apparatus is composed of cooperating elements constructed in substantial accordance with those illustrated and intended to function in the manner described to effect the desired results. The salient features of the invention have been noted herein and the claims will indicate the range of equivalents which may be employed without departing from the scope of the invention.

I claim as my invention:

1. Apparatus for the thermostatic electric control of heating systems including, in combination, an expansible vessel adapted to be moved bodily, an electric motor, devices the movement of which is initiated by the expansible vessel to control the circuit of the motor, a controlled element in the heating system operatively connected to the motor, an adjustable seat for the thermostat, a slidable rack for adjusting said seat and moving the thermostat bodily, and a manually operated indicator arm operatively connected to the rack and movable over a temperature scale to indicate the temperature range of effective operation of the thermostat adapted to control the apparatus.

2. An electric motor for controlling heating systems connected to one conductor of an electrical circuit, a round commutator in constant electrical connection with the motor and operatively connected to the motor armature, two terminals, fingers in electrical connection with the respective terminals and in operative engagement alternately with the commutator, eccentric recess in the periphery of the commutator in which one of said fingers rests depending upon the angular position of the commutator and a switch connected to the second conductor of the circuit and movable under the influence of a thermostat into engagement with one or the other of the said terminals to control the motor circuit.

3. An electric motor for controlling heating systems connected to one conductor of an electrical circuit, a round commutator in constant electrical connection with the motor, a commutator shaft, a gear thereon, a spiral gear formed in the end of the motor armature engaged directly with said first named gear to rotate the commutator shaft unidirectionally, an arm on the commutator shaft connected operatively with a controlled element in the heating system, two terminals, fingers in electrical connection with the respective terminals and in operative engagement alternately with the commutator, a recess in the periphery of the commutator in which one of said fingers rests depending on the angular position of the commutator and a switch connected to the second conductor of the circuit and movable under the influence of a thermostat into engagement with one or the other of the said terminals to control the motor circuit.

4. An electric motor for controlling heating systems connected to one conductor of an electrical circuit, a commutator in constant electrical connection with the motor, a commutator shaft, a gear thereon, a spiral gear on the motor armature engaged with said first named gear to rotate the commutator shaft unidirectionally, an arm on the commutator shaft, an adjustable connection between the arm and the controlled element of the heating system, two terminals, fingers in electrical connection with the respective terminals and in operative engagement alternately with the commutator, a recess in the commutator in which one of said fingers rests depending on the angular position of the commutator and a switch connected to the second conductor of the circuit and movable under the influence of a thermostat into engagement with one or the other of the said terminals to control the motor circuit.

This specification signed this 9th day of December 1919.

EDWARD E. GOLD.